Feb. 12, 1952    M. M. FULMER    2,585,379
DOUGHNUT CUTTING MACHINE
Filed Dec. 31, 1947    2 SHEETS—SHEET 1
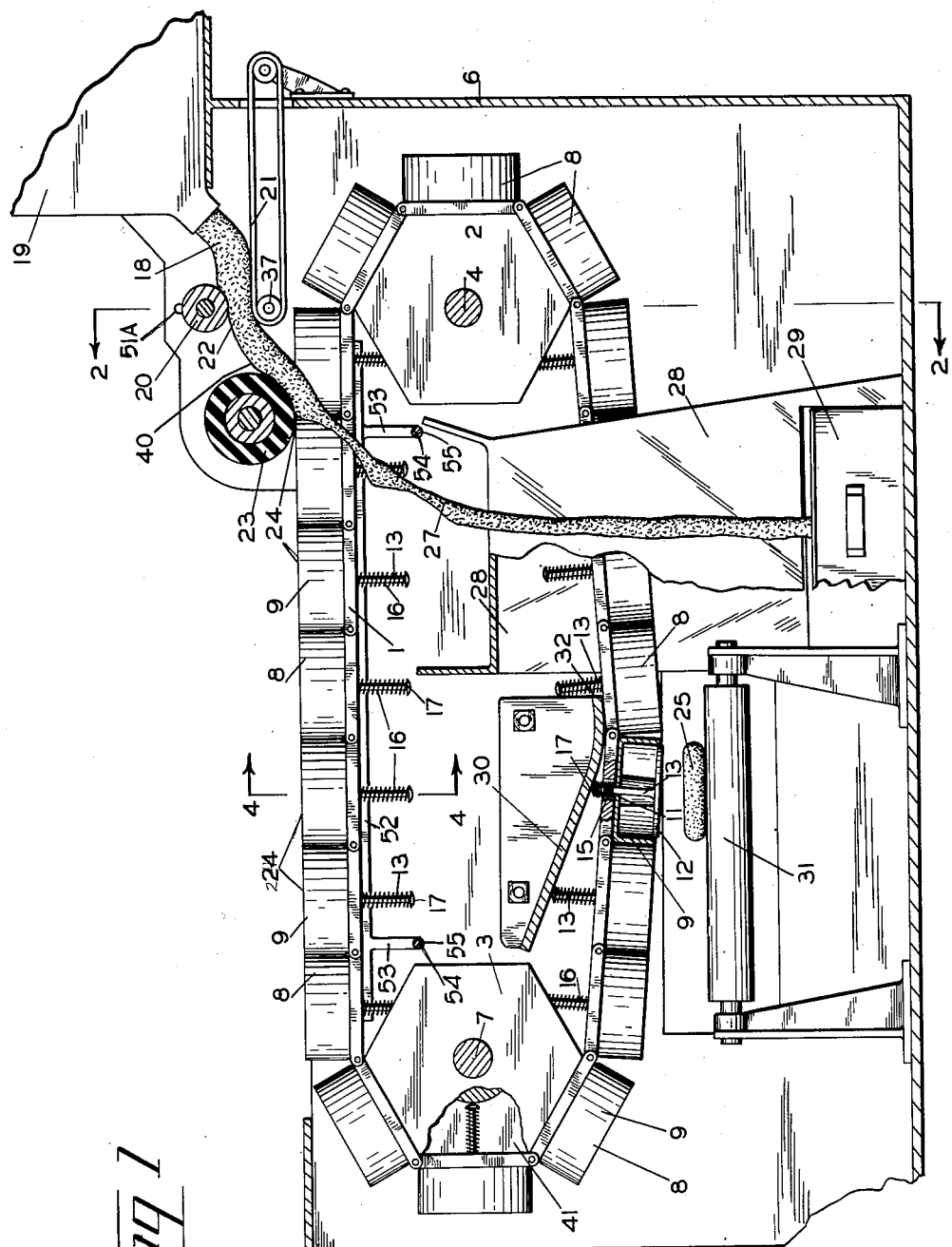
INVENTOR.
MAE M FULMER
BY
ATTORNEY Feb. 12, 1952 M. M. FULMER 2,585,379
DOUGHNUT CUTTING MACHINE
Filed Dec. 31, 1947 2 SHEETS—SHEET 2
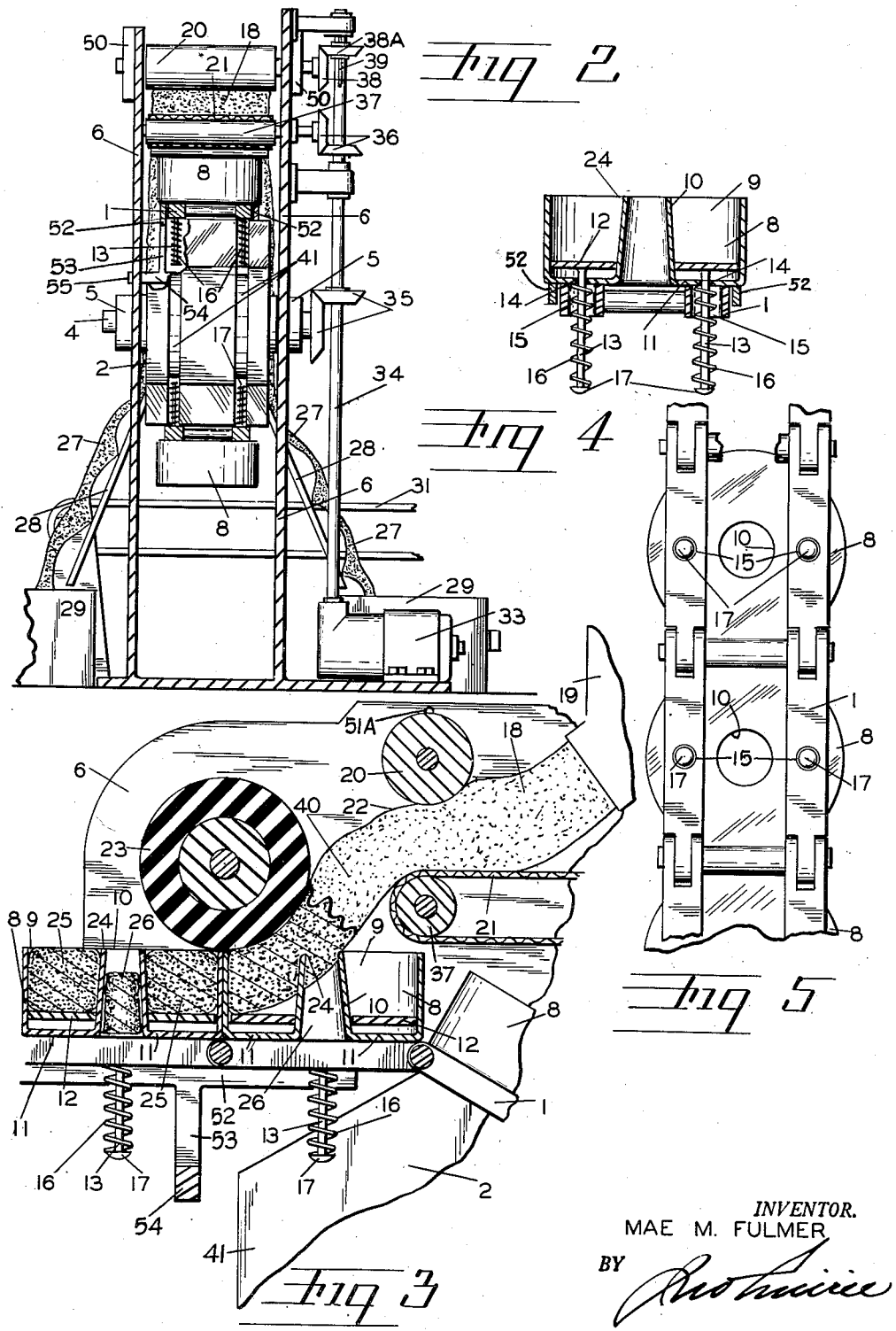
INVENTOR.
MAE M. FULMER
BY
ATTORNEY Patented Feb. 12, 1952

2,585,379

UNITED STATES PATENT OFFICE 2,585,379

DOUGHNUT CUTTING MACHINE

Mae M. Fulmer, Portland, Oreg.

Application December 31, 1947, Serial No. 794,828

10 Claims. (Cl. 107—20)

1

The primary object of this invention is to design a doughnut cutting machine automatic in nature that will roll the dough before cutting the same into doughnuts and that will produce the least quantity of waste.

In carrying out the object of this invention a series of dough cutting units are assembled together in a chain travelling over driven and driving sprockets, having means within the machine for discharging the cut doughnuts from these units automatically.

A further object of the invention is to provide a supply of dough in strips, the strip of dough to be fed into the machine having first been rolled, which is a very important object of this invention, particularly in the cutting of raised doughnuts.

After the dough has been rolled it is delivered to the doughnut cutting and forming units travelling under a pressure drum which forces the dough into the forming units. The dough is then carried with the chain of units to the delivery station where the doughnut is ejected from the forming unit onto a receiving station, which may be a conveyor or other suitable receiving tray.

A still further object of this invention is to provide a small, light and automatic doughnut cutting machine adapted to be used in the smaller types of bakeries.

These and other incidental objects will be apparent in the drawings, specification and claims.

Referring to the drawings:

Figure 1 is a sectional side view of my new and improved doughnut cutting machine.

Figure 2 is an end sectional view taken on line 2—2 of Figure 1, looking in the direction indicated.

Figure 3 is an enlarged detail fragmentary view in section illustrating how the doughnut cutting units receive the dough from the source of supply.

Figure 4 is a sectional detail view taken through one of the doughnut cutting and forming units.

Figure 5 is an inverted plan view of the doughnut cutting and forming units associated with the chain to which they are mounted.

Referring more specifically to the drawings:

My new and improved doughnut cutting machine consists of a chain 1 trained about the driving sprocket 2 and the driven sprocket 3. The driving sprocket 2 is keyed to the cross shaft 4 which is journalled within bearings 5 forming part of the framework 6 of the machine. The driven sprocket 3 is keyed to the cross shaft 7, which is journalled within suitable bearings not

2 here shown. The framework 6 is preferably made from sheet material forming a closure for the chain and sprocket assembly and other parts to be described later.

Mounted upon the chain 1 are doughnut cutting and forming units 8, which consist of a cup 9 having a tubular cutter 10 located centrally of the said cup, its top surface being level with the top of the cup. Located adjacent the bottom 11 of the cup 9 and around the cutter 10 is a ring 12 having a pair of plungers 13 extending through the openings 14 of the bottom 11 of the cup 9 and through the intermediate holes 15 in the links of the chain 1. Springs 16 have one of their ends bearing against the bottom 11 of the cup and their opposite ends against the head 17 of the plunger 13 maintaining the ring 12 adjacent the bottom 11 of the cup except when the plunger is operated by a cam later to be described.

The dough 18 is delivered from the hopper 19, which may be of any suitable type, the mechanism of which is not here shown. The dough may be extruded from this hopper by air or mechanical means. The dough then travels between the roller 20 and the feed belt 21, the roller 20 being adjustable so that it will roll the dough at the point 22 to any desired thickness. This feature is one of the outstanding features of my invention, the object of which is to roll the dough and by so rolling the dough it has been found that the doughnuts have a finer texture, better keeping qualities and uniformity in their cooking, also forcing the air out of the dough which is most desirable in the producing of raised doughnuts. One of the objections to doughnut machines in the past has been that the dough was not rolled previous to cutting, therefore the product has never been as satisfactory as when they were rolled by hand and cut by hand cutters.

After the dough passes between the roller 20 and the belt 21 it travels under the pliable pressing roller 23 which is driven by pressure contact with the top edges 24 of the units 8, as best seen in Figures 2 and 3. The dough passes onto the upper edges 24 of the units 8 and under the roller 23 which presses the dough into the cups 9 and the central cylindrical cutter 10 to form the doughnuts 25. The excess dough 26, from the hole of the doughnut, is discharged down through the tubular cutter 10 and hole within same centrally in the bottom 11, and the excess dough around same at either side of the doughnut cutting unit as indicated at 27 is discharged onto the chutes 28 at opposite sides to the receiving containers 29.

The formed doughnuts contained within the dough cutting and forming units 8 will be carried around over the sprocket 3 and under the cam 30 and above the conveyor 31. As the units approach the cam 30 the heads 17 of the plungers 13 will engage the cam, forcing said plungers 13 through the holes 15 in the links of chain 1 and through the openings 14 in the bottoms 11 of the cups 9, thereby moving the rings 12 down through the units 8 and pressing the doughnut 25 out of the cup 9 and onto the conveyor 31. As the plunger clears the end 32 of the cam 30 the springs 16 will return the plungers to the position shown in Figure 4 placing the bottom ring 12 in position for receiving another quantity of dough as above described.

A driving unit 33 drives the vertical shaft 34, which has a set of bevel gears 35 for driving the chain 1 by the sprocket 2 through the shaft 4, also a set of bevel gears 36 for driving the belt 21 through the roller 37. Located above these driving gears are bevel gears 38 and 38A for driving the roller 20 for rolling the dough as above described. This roller is adjustable up and down, therefore the bevel gear 38A slides on the key 39 of the driving shaft 34.

In order to permit adjustment of the roller 20, the shaft thereof is adjustable up and down by suitable well-known means (not shown) in slots 51A of bearing mounts 50, to vary the spacing between the roller 20 and the movable table formed by the top lap of the belt 21 to feed, roll and compress the dough 18 to the proper thickness after it is extruded from the hopper 19 as a strip. The slidable gear 38A allows the roller 20 and gear 38 fixed to its shaft to be adjusted up or down while gears 38 and 38A are in constant engagement to insure driving of the roller 20. By this means, the roller 20 may be adjusted up and down relative to the belt table 21 to control the thickness of the slab or strip of dough fed to the doughnut mold units 8 and thus, the amount of dough going into the mold cups when cut providing an effective control over the weight of the doughnuts so that they will be uniform. By compressing and slacking up the travel of the pressed dough from between roller 20 and belt 21, at point 40 by slowing same down in passing between roller 23 and mold chain 1 by running the roller 20 and table belt 21 slightly faster than the chain and cut-off roller or drum 23, the finished doughnuts will be of uniform and finer texture, eliminating all air holes and pockets, so that most economical production may be had and the size of the doughnuts can be absolutely determined in advance and maintained throughout the doughnut cutting process. Otherwise, if the roller 20, belt 21, roller 23 and mold chain 1 are caused to travel at the same speed, the dough would stretch at the point 40 and when the same was cut on top of the cups by the roller 23, they would shrink into odd shapes and not be uniform, whereas the present machine by compressing the dough before being cut and pressed into the cups in such compressed condition, provides or allows for expansion thereof in and filling of the cups and is a very desirable condition which heretofore has only been possible when forming the dough by hand.

A guide is also provided for supporting the upper run of the mold chain 1 consisting of longitudinal strips or bars 52 beneath the doughnut mold units 8 outwardly of the links of chain 1, the cups 9 resting and moving thereon at the bottoms 11. The bars 52 are supported by the downwardly extending legs 53 which form parts of substantially U-shaped members or cross bars 54 having their ends engaged through and supported in the sides of the frame or casing 6 of the machine at 55. These strips or bars 52 thus support the upper run of the mold units 8 in a horizontal plane to prevent same sagging and take the pressure of the retarding and cut-off roller 23 against the dough strip 18 and upper edges of the dough cutting and forming units 8 at cups 9 and tubular cutters 10 to form the doughnuts as previously described. The idle roller or drum 23 and chain 1, therefore have the effect or function of retarding and causing backing up, expansion and increasing the thickness of the dough slab or strip before passing between roller 23 at cups 9 of chain 1, permitting the dough to contract after rolling the strip between the sizing roller 20 and belt 21 and allowing the dough to expand in the cups 9 after being pressed into the same and cut, giving the same effect as a dough maker picking up and shaking or dropping the dough lengthwise or endwise against a table or allowing it to fully contract before being cut and expand in the cups to insure uniformity in size, weight and texture which can be accurately controlled by the vertical adjustment of the feeding and pressing roller 20 relative to the belt 21 to insure uniformity of the run of doughnuts. If the roller 23 and cups 9 of chain 1 traveled as fast as or faster than roller 20 and belt 21, they would stretch the dough at the point 40 and when the same was cut on top of the cups 9 and tubular concentric cutters 10 therein on and moving with the chain 1 by the roller 23, they would shrink into odd shapes and loose in the cups and not be uniform. In other words, there would be no determining of the shape of the dough after being cut, into doughnuts, but by slowing down the travel of the rolled dough before being placed or pressed and cut into the cups, everyone of the doughnuts will be of uniform size, and this in the doughnut industry is indispensable once it has been performed by the doughnut maker. By such definite adjustment of the thickness of the dough between the roller 20 and belt table 21 and holding the rolled dough strip back at the point 40 by the roller 23 and cups on the chain 1, in addition to economical production and size of the doughnuts, uniformity and finer texture is given to the finished doughnut eliminating all air holes, voids or pockets.

In order to completely fill the cutting units 8 with dough, the speed of the belt 21 and roller 20 are slightly faster than the speed of the conveyor 1, thereby compressing retarding, packing up and increasing the thickness of the dough strip or slab in front of the idle pressing roller 23 at the point 40 so that when the doughnut has been cut within the units 8 it will not shrink away from the side walls of the same.

Referring to Figures 1 and 2, the plungers 13 register with the slots 41 formed within the sprockets 2 and 3 so that they will pass over the sprockets without compressing the springs 16 or operating the doughnut ejecting means including plungers 13 and rings 12 connected thereto, until heads 17 engage cam 30 to compress springs 16 and move plungers 13 and rings 12 downwardly to eject the doughnuts 25 from the cups 9 as previously pointed out. It can be readily understood that my machine is entirely automatic from the time it receives the dough at the station 18 until the same is delivered onto the conveyor 31 in the form of a doughnut.

Referring to Figures 1 and 2, it will be noted that there is very little waste in the cutting of the dough with my new and improved doughnut cutting machine. This is one of the outstanding features of the machine providing for a greater production.

I do not wish to be limited to the exact mechanical structure illustrated, as other mechanical equivalents may be substituted still coming within the scope of my claims.

What I claim as new is:

1. A doughnut machine comprising a plurality of doughnut molds connected together in an endless chain, means driving said chain, an endless belt above said chain forming a table, a roller above said table for rolling dough supplied to the table, a roller in advance of the table and over the molds for feeding the rolled dough to said molds, and means driving said table and the first-mentioned roller at a higher speed than said chain.

2. In a doughnut machine the combination of a plurality of doughnut molds connected together in an endless chain, a pair of sprockets supporting said chain, each sprocket having a plurality of flat mold supporting surfaces, each surface being angularly related to its adjoining surfaces, means for feeding a strip of dough of predetermined thickness onto the molds, means cooperating with the chain and feeding means for slowing up the travel of the strip of dough before passing onto the molds, for pressing the dough into the molds and cutting same into doughnuts, and means for discharging the doughnuts from the molds.

3. A doughnut machine comprising a plurality of doughnut molds connected together in an endless chain, means for driving said chain, means for supplying a strip of dough, adjustable means for receiving and rolling said strip of dough to a predetermined thickness prior to passing onto said molds, and means cooperative with the molds for retarding and compressing the rolled strip of dough and pressing the same into the molds to cut the same into doughnuts.

4. A doughnut machine, as set forth in claim 3, wherein a guide means is provided beneath the upper run of the mold chain for supporting the same and taking the pressure of the compressing means on the molds in cutting the dough.

5. A doughnut machine, comprising an endless mold chain, means for driving said chain, a table comprising a driven endless belt above one end of said chain, means for feeding a strip of dough onto the table, a roller adjustably mounted above the belt to roll the dough therebetween at a predetermined speed and thickness and feed the same onto one end of the mold chain and a cut-off roller above said end of the mold chain and cooperating with the latter for retarding and pressing the rolled strip of dough into the molds to cut the same into doughnuts.

6. A doughnut machine as set forth in claim 5, wherein the table belt and first roller are driven faster than the mold chain to retard the movement of the dough at the chain and cut-off roller and compress the dough before passing between the cut-off roller and mold chain for cutting and pressing same into the molds, to regulate the weight and thickness of the doughnuts and insure filling of the molds, and cam operated means for ejecting the doughnuts from the molds in inverted positions.

7. A doughnut machine comprising a plurality of doughnut molds connected together in an endless chain, means for driving said chain, means for supplying a strip of dough, adjustable means for receiving and rolling said strip of dough to a predetermined thickness prior to passing onto said molds, and means cooperative with the molds for retarding, causing expansion of the strip of dough and compressing the rolled strip of dough and pressing the same into the molds to cut the same into doughnuts.

8. A doughnut machine, comprising an endless mold chain, means for driving said chain, a driven endless belt above one end of said chain, means for feeding a strip of dough onto the belt, a roller adjustably mounted above the belt to roll the dough therebetween at a predetermined speed and thickness and feed the same onto one end of the mold chain and a cut-off roller above said end of the mold chain and cooperating with the latter for retarding the feeding of the strip to expand same before passing between the cut-off roller and mold chain and pressing the rolled strip of dough into the molds to cut the same into doughnuts.

9. In a doughnut making machine traveling means to roll the dough into a slab of uniform thickness and cause it to move therefrom, and movable means to press and cut the dough into annular doughnuts, said latter means including annular cups and slowing up the travel of the dough slab before being pressed and cut into the cups, to compress same and allow it to expand in the cups after being cut to insure uniformity of size, weight and texture of the doughnuts.

10. In a doughnut making machine, adjustable means to roll the dough into a strip of uniform thickness and width and cause it to travel therefrom, and means to press and cut the strip into annular doughnuts, said latter means including a resilient idle pressing roller and a cooperating driven endless member with annular cups thereon and movable therewith for contact with the roller to press and cut the strip into the cups, said member being driven slower than the dough rolling means to retard the travel of the strip before passing between said roller and endless member to compress and expand the strip and allow the same to expand in the cups after being cut into doughnuts to insure uniformity of size, weight and texture of the doughnuts.

MAE M. FULMER.

REFERENCES CITED

The following references are of record in the file of this patent:

UNITED STATES PATENTS

| Number | Name | Date |
| --- | --- | --- |
| 29,295 | Marsh | July 24, 1860 |
| 215,006 | Lampert et al. | May 6, 1879 |
| 376,068 | Chase | Jan. 10, 1888 |
| 1,429,093 | Paranteau | Sept. 12, 1922 |
| 1,434,696 | Gripp et al. | Nov. 7, 1922 |
| 1,565,575 | Levy | Dec. 15, 1925 |
| 1,750,708 | Edwards | Mar. 18, 1930 |
| 2,186,767 | Price | Jan. 9, 1940 |